United States Patent
Te'eni et al.

(10) Patent No.: US 6,725,452 B1
(45) Date of Patent: Apr. 20, 2004

(54) METHOD FOR RESOLVING DEPENDENCY CONFLICTS AMONG MULTIPLE OPERATIVE ENTITIES WITHIN A COMPUTING ENVIRONMENT

(75) Inventors: Moddy Te'eni, Tel Aviv (IL); Ilan Shufer, Bet Dagan (IL)

(73) Assignee: Aduoa, Inc., Cupertino, CA (US)

( * ) Notice: Subject to any disclaimer, the term of this patent is extended or adjusted under 35 U.S.C. 154(b) by 377 days.

(21) Appl. No.: 09/585,694

(22) Filed: Jun. 1, 2000

(51) Int. Cl.⁷ .................................................. G06F 9/44
(52) U.S. Cl. .................................................... 717/168
(58) Field of Search ............................... 717/102–109, 717/114–117, 120–125, 162–177

(56) References Cited

U.S. PATENT DOCUMENTS

| | | | |
|---|---|---|---|
| 5,499,357 A | 3/1996 | Sonty et al. | 710/104 |
| 5,535,406 A | 7/1996 | Kolchinsky | 712/10 |
| 5,555,416 A | 9/1996 | Owens et al. | 717/128 |
| 5,586,304 A | 12/1996 | Stupek, Jr. et al. | 717/170 |
| 5,588,143 A | 12/1996 | Stupek, Jr. et al. | 703/20 |
| 5,809,287 A | 9/1998 | Stupek, Jr. et al. | 703/22 |
| 5,825,651 A | 10/1998 | Gupta et al. | 700/103 |
| 5,867,714 A | 2/1999 | Todd et al. | 717/172 |
| 5,875,327 A | 2/1999 | Brandt et al. | 713/3 |
| 5,960,189 A | 9/1999 | Stupek, Jr. et al. | 717/169 |
| 5,961,642 A | 10/1999 | Lewis | 713/1 |
| 5,974,474 A | 10/1999 | Furner et al. | 710/8 |
| 6,038,399 A * | 3/2000 | Fisher et al. | 717/178 |
| 6,047,129 A * | 4/2000 | Frye | 717/172 |
| 6,096,094 A * | 8/2000 | Kay et al. | 717/168 |
| 6,151,643 A * | 11/2000 | Cheng et al. | 710/36 |
| 6,167,567 A * | 12/2000 | Chiles et al. | 717/173 |
| 6,199,203 B1 * | 3/2001 | Saboff | 717/168 |
| 6,226,792 B1 | 5/2001 | Goiffon et al. | 717/120 |
| 6,230,199 B1 * | 5/2001 | Revashetti et al. | 709/224 |
| 6,247,128 B1 * | 6/2001 | Fisher et al. | 713/100 |
| 6,256,773 B1 | 7/2001 | Bowman-Amuah | 717/121 |
| 6,289,513 B1 * | 9/2001 | Bentwich | 717/106 |
| 6,442,754 B1 * | 8/2002 | Curtis | 717/175 |
| 2002/0013775 A1 * | 1/2002 | Skovgaard | 706/48 |

FOREIGN PATENT DOCUMENTS

| | | | |
|---|---|---|---|
| EP | 0 632 371 | 1/1995 | |
| EP | 0 632 371 A1 | 1/1995 | G06F/9/44 |

OTHER PUBLICATIONS

Edward C. Bailey, "Maximum RPM—Taking the Red Hat Package Manager to the Limit," published by Red Hat Software, Inc., Jun., 1998, pp. i–xx, 15–34; 79–92; 119–124; 165–186; 209–217 and 328–330.

Bill McCarty, "Learning Debian GNU/Linux—Appendix C—The Debian Package Management Utilities—Using dselect," O'Reilly Online Catalog, Sep., 1999, 6 (six) pages of text.

Pending United States Patent Application Assigned to Aduva, Inc.: Ser. No.: 10/013,307, Filing Date: Dec. 7, 2001, Inventor: Te'eni et al.

U.S. patent application Ser. No. 09/521,908, Segal, filed Mar. 9, 2000.

(List continued on next page.)

Primary Examiner—Todd Ingberg
Assistant Examiner—Tuan Anh Vu
(74) Attorney, Agent, or Firm—Brinks Hofer Gilson & Lione

(57) ABSTRACT

A computer-based method sets up automatically a computer system configuration in association with a computer system upgrade process. In accordance with the system configuration, the upgrade process installs a required set of operative elements in order to provide for the reliable operation of the computer system. The operatively correct combination of hardware, system and application software components is accomplished by inter-component dependency checking and conflict resolving procedures utilizing specific inter-component dependency rules tables and component definition and inter-component relationship definition databases.

17 Claims, 10 Drawing Sheets

OTHER PUBLICATIONS

U.S. patent application Ser. No. 09/585,685, Segal et al., filed Jun. 1, 2000.

U.S. patent application Ser. No. 09/586,685, Segal et al., filed Jun. 1, 2000.

"Safe Mechanism for Installing Operating System Updates with Applications," IBM Technical Disclosure Bulletin published by IBM, vol. 41, No. 1, Jan., 1998, pp. 557–559.

* cited by examiner

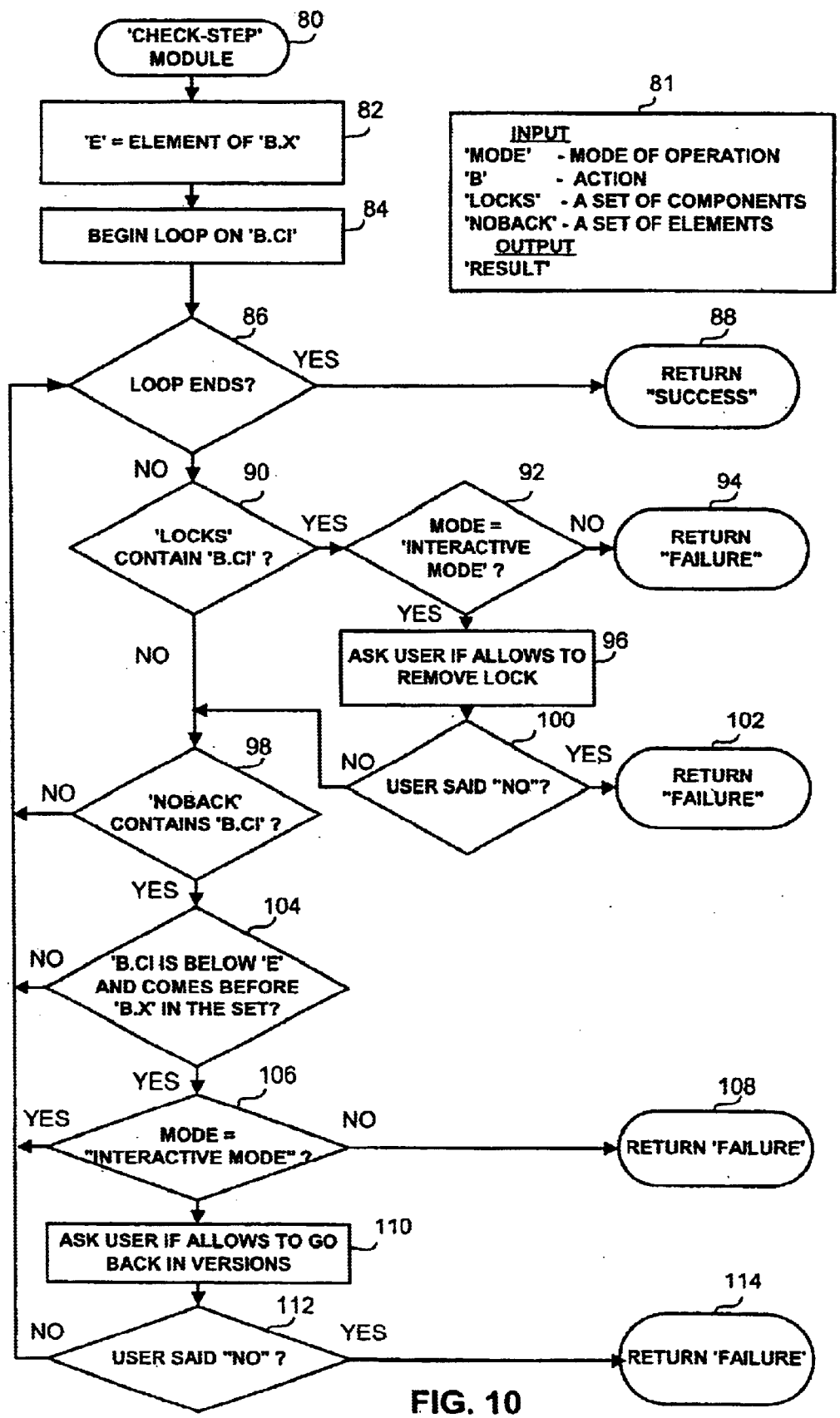

METHOD FOR RESOLVING DEPENDENCY CONFLICTS AMONG MULTIPLE OPERATIVE ENTITIES WITHIN A COMPUTING ENVIRONMENT

BACKGROUND OF THE INVENTION

1. Field of the Invention

The present invention relates generally to a method that establishes a correct combination of different hardware and software entities necessary for the reliable operation of a computer system and more particularly to a method for resolving dependency conflicts across diverse sets of functional entities while installing or removing specific operative elements in a computing environment.

2. Discussion of Related Art

Computing environments include hardware components and software components. The components are divided into various types: processor devices, disk devices, printer devices, software packages, software libraries, kernel bases, kernel parameters, kernel modules, drivers, configuration files, flags, application packages and the like. The software elements also referred to as modules, or programs, comprise a multitude of executable instructions in hardware-readable format. The components have diverse functionality or applications. Hardware devices are analog interfaces to the real world and perform physical work such as switching electronic circuits, transmitting electrical signals, magnetizing coils, pressing ink into paper surfaces, and the like while software modules operate in a digital mode and control both the operation of the hardware devices, the operation of other software modules in a preset manner, supply various services involving data manipulation and computation by receiving, processing, transforming and outputting information units in a predefined manner. System software modules, such as kernel modules, supervise, manage and control the operations of the computing environment in its entirety.

Typically in a computing environment various hardware and software entities operate in close co-operation. Therefore, within a typical computing environment a plurality of hardware and software entities have multiple dependency relationships with a plurality of other hardware and software entities. Such a dependency relationship could be defined as follows: in an exemplary computing environment for component "A" perform correctly, component "B" and component "C" are both needed. Therefore, in the exemplary computing environment, such as an operating system platform, the utilization of component 'A' necessitates the presence of component "B" and the presence of component 'C'.

Computer systems are practically never static. Frequently changes have to be made. Changing requirements of the environment necessitates the addition and/or replacement of hardware devices or software modules thereby inducing the addition and/or replacement of other software modules. Improved versions of present devices or modules effect the replacement of older versions thereof. New, state-of-art software packages are installed repeatedly in a dynamic process of development and growth. Modifying a computer system typically involves installation or removal of hardware devices or software modules—a process referred to as upgrading the system. When performing the predefined procedures necessary for an upgrade to be implemented frequently dependency conflicts may arise among the components present and the components to be installed. Such dependency conflicts turn the upgrading process into a complicated, prolonged, difficult, and sometimes unsuccessful operation.

Conventionally, users utilizing specific installation utilities perform the installation and the update of components. The majority of utilities operate in a basic fashion; installable components are installed, replacing, if necessary, present components, no dependency checks are made therefore, no attempts are made to solve the dependency conflicts.

Some more advanced utilities perform dependency checks, typically abort the installation process when required and also inform the users in regard to the conflicts but make no attempts to solve the related problem.

It will be obvious to those skilled in the art that there is a long felt need for a comprehensive, totally automated installation utility to assist users of small and medium-size computer system platforms in the exacting task of managing complex and dynamically evolving computing systems. Specifically, there is an urgent need for an effective installation utility designed to resolve automatically inter-component dependency conflicts so as to enable routinely the accomplishment of fast, solid, efficient and convenient computer system upgrades.

BRIEF SUMMARY OF THE INVENTION

One aspect of the present invention regards a method of assisting users of computer client systems in the conduct of an upgrade of a computer system, having a central processing unit, a storage device and a communication device, by automatically establishing an operatively correct combination of a set of components in the computing environment of the computer system. The method includes obtaining at least one control table from a storage device, the at least one control table having a first set of information regarding a set of possible components to be used in the computer environment of the computer system and setting up at least one result table on the storage device, the at least one result table holding a second set of information resulting from automatically establishing an operatively correct combination of two or more components within the set of possible components. Examining the at least one control table for dependency conflicts arising among the set of possible components in the at least one control table and identifying the dependency conflicts arising among the set of possible components in the at least one control table. Resolving the dependency conflicts among the set of possible components in the at least one control table and creating result-related actions based on the resolving.

The above aspect of the present invention overcomes the disadvantages of the prior art by providing a novel method and a system to dependency relationship analysis and to dependency conflict resolving among multiple sets of hardware and software components in a computing environment.

The above aspect of the present invention provides a conflict resolving mechanism implemented as a software program that associates lists of installed components with lists of components to be installed, removed or updated. By utilizing a set of related predetermined dependency rules pertaining to both component lists the dependency conflict resolving module resolves existing conflicts among the hardware and software components and guides the user through a sequence of appropriate actions. Consequently, the user can utilize the information so obtained in a useful manner such as performing one or more recommended installation procedures in order to accomplish a successful system upgrade.

The present invention will be understood and appreciated more fully from the following detailed description taken in conjunction with the drawings in which:

BRIEF DESCRIPTION OF SEVERAL VIEWS OF THE DRAWINGS

FIG. 10 is a flow chart illustrating the flow of program logic of an embodiment of a "check-step" module, in accordance with the present invention.

DETAILED DESCRIPTION OF THE INVENTION

A computing environment is shown in FIGS. 1–10, in which like numerals represent elements throughout the several figures, aspects of the present invention and the exemplary operating environment will be described for purpose of clear understanding.

Figure 1:
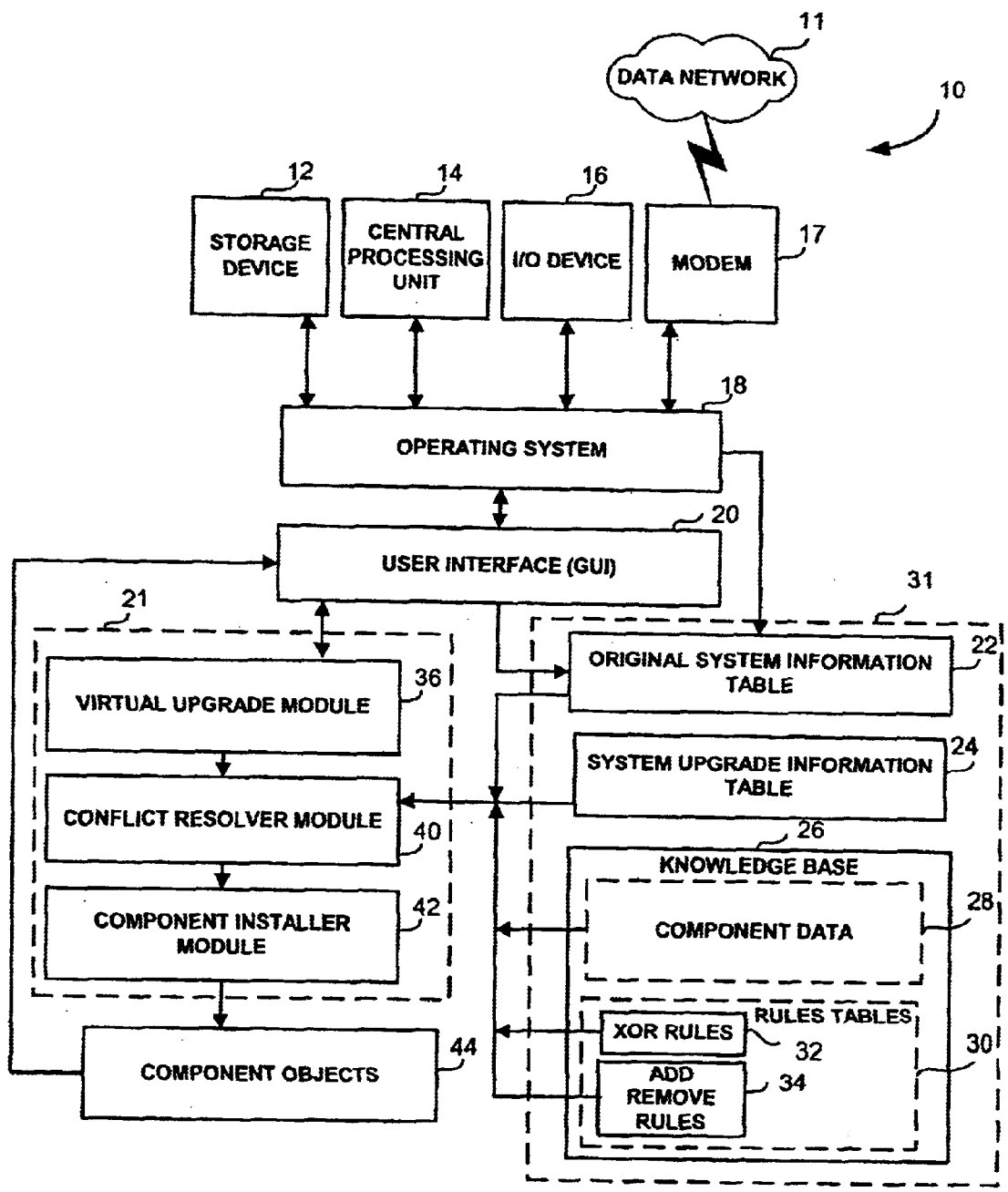
FIG. 1 is a block diagram of the computing environment in which the dependency conflict resolver module is operating, in accordance with a preferred embodiment of the present invention.

Referring now to FIG. 1 there is shown constructed and operative in accordance with the preferred embodiment of the present invention the computing environment in which the dependency conflict resolver module is operating.

FIG. 1 and the following discussion are intended to provide a brief, general description of a suitable computing environment in which the present invention may be implemented. While the invention will be described in the general context of a client-based computer system, those skilled in the art will recognize that the invention also may be implemented in combination with other environments.

System 10 is a computing platform controlled by an operating system 18. System 10 contains a storage device 12 such as a hard disk, a Central Processing Unit (CPU) 14, an I/O device 16, a Graphical User Interface (GUI) 20 such as display terminal, and a communication device 17 such as a modem that links system 10 via appropriate communication lines to a data network 11. There are two distinct sets of software entities involved in the process of dependency conflict resolving (1) control tables 31, and (2) application programs 21. Additionally, system 10 contains a component objects table 44.

The component objects table 44 contains the collection of components to be installed. The components could be of all the practicable types typically having hardware and software elements of a computing environment; hardware devices, hardware drivers, operating system components such as kernels, utilities, programming languages, application programs, debuggers, communication packages, application packages, libraries and the like. In the preferred embodiment of the present invention, component objects table 44 is downloaded by a communication device, such as modem 17, from a central support server system and stored on storage device 12 such as a hard disk or the like. In different embodiments, other methods could be used for example component objects table 44 may be downloaded automatically from the supporting server system after conflict resolver module 40 has completed the dependency resolving process.

The set of the control tables 31 includes original system information table 22, system upgrade information table 24, and knowledge base 26 combining component data database 28 and rules tables 30. Rules tables 30 contains xor rules table 32 and add-remove rules table 34.

Original system information table 22 contains the entire list of hardware and software components present in the operative system and stored on storage device 12. The user of system 10, utilizing user interface (GUI) 20, creates original system information table 22 by using specific predefined utility programs that access specific predefined system libraries and system files.

System upgrade information table 24 is created and maintained by the user via user interface (GUI) 20 using specific programs. System upgrade information table 24, stored on storage device 12, is intended to hold the list of components to be installed.

Knowledge base 26 is a set of related tables such as component data table 28, xor rules table 32 and add-remove rules table 34. Component data 28 includes useful data fields as well as control information concerning the components existing in component objects table 44. Additionally, component data table 28 holds the requisite data pointers to the relevant entries in rules tables 30, specifically in xor rules table 32 and in add-remove rules table 34. Xor rules table 32 and add-remove rules table 34 contain the dependency rules, encoded into a particular format by using a specific rules language, that refer to the component objects to be installed. The knowledge base 26 is downloaded via modem 17 from the support server system. Typically, only the requisite parts of knowledge base 26 that are relevant to the current installation process or the current operative system are downloaded.

A virtual upgrade process is defined as the detailed and careful examination of the component data and the dependency rules associated with the component objects needed to be inserted into the existing framework of the operative system installed for potential dependency conflicts. In addition, where a dependency conflict is recognized the virtual upgrade process will effect the resolving of practically all the potential dependency conflicts. In contrast, a Genuine Upgrade process is defined as the actual installation of the required components in the operative system after all the dependency conflicts have been resolved.

The dependency rules are inherited along a downward path of the knowledge base 26. Each component inherits the rules of the components above. For example, if a specific software utility such as an editor has a "need-rule' such as "the editor needs graphical user interface" then all the versions of the same editor stored in the nodes under the editor in the knowledge base 26 will be having the same "need-rule" implicitly, like as "editor version 3.1.1 needs graphical user interface" without having to be defined explicitly.

In this application, the term "upgrade" refers both to the installation and the removal of operative system components, such as hardware devices, software modules, hardware drivers, application packages, operating system modules, kernel bases, libraries and the like.

The set of application programs or application modules includes virtual upgrade module 36, conflict resolver module 40 and component installer module 42. Virtual upgrade module 36 is the manager of the virtual upgrade process activated by the user via user interface (GUI) 20. Virtual upgrade module 36 creates upgrade processes for the following tasks that are performed sequentially: (a) to collect all the information necessary for the dependency analysis and the dependency conflicts resolving process such as the relevant component data information units from component data table 28, the encoded dependency rules from xor-rules table 32 and from add-remove rules table 34 module, (b) to activate conflict resolver module 40 in order to check for potential dependency conflicts and to resolve any dependency conflicts that might arise as a result of the planned installation process, (c) to initiate the downloading of the required component objects from the supporting server system or from any other source, and (d) to perform a genuine installation of the selected component objects from component objects table 44.

The intention of above general description is to provide a clear picture of the standing and functions of the conflict resolver module 40 in the larger framework of the computing environment thereof. It will be easily understood perceived that conflict resolver module 40 is a central element of the virtual upgrade process. The operation and the functionalities of the conflict-resolver module 40 will be described next in association with the related control tables when necessary.

A number of the elements, tables, operations, and rules set forth in the following description are described in full detail in two related patent applications: U.S. patent application Ser. No. 09/585,685, by Ury Segal et al. and entitled "A Virtual System Configurator For Client Systems" and filed concurrently with the present application, and U.S. patent application Ser. No. 09/586,685, by Ury Segal et al. and entitled "A Virtual System Configurator For Linux" and filed concurrently with the present application, the entire contents of each application are incorporated herein by reference.

The input data elements for the conflict-resolver module 40 will be described next. To prepare for the installation of the new components or for the upgrading of the operatively installed components an original system information table 22 is created. In the preferred embodiment of the present invention, the user of the computing environment creates the original system information table 22. It would be easily perceived that the creation of original system information table 22 could be initiated in other ways as well such as automatic activation by appropriate software modules and the like. Original system information table 22 is built by utilizing diverse software application programs that that extract the required information from the operatively installed system and insert the information into a tree-like data structure. The components installed in the operative system will be represented in the nodes of the tree-like structure designated by predefined numbers. The predefined numbers will be held in the leaves of the tree-like data structure. Therefore, the original system information table 22 has structured information in a predefined format concerning the set of the components installed in the computer prior to a preferred installation process.

Installable components are either new components or new versions of existing components that are stored in the component objects table 44 either in object code form or in a source language. The component data table 28 that holds a list of all the installable components points to the components stored in the component objects table 44. Component data table 28 is built as a tree-like data structure in a similar manner to the original system information table 22 and the information concerning the installable components is represented by predefined numbers therein. The predefined numbers are held in the leaves of the component data table 28 in a similar manner to the information stored in the original system information table 22. The numbering system is the same for both sets of information stored in tables 22 and 28. Therefore, the information in the leaves of the component data table 28 makes available the recognition whether a specific component represented in the component data table 28 exists in the operatively installed system through accessing the original system information table 22. Apart from the information about installable components, the nodes of the component data table 28 could hold other types of information such as various generic definitions referring to the installable components placed under them and pointed to by them. For example, a node could hold generic information such as "version", meaning that all leaves pointed to by the generic node are holding information about different versions of the same component.

The user can browse the component data table 28 and user preferences can be set on any one of the nodes therein. For example, the preferences set option makes available to the user the locking of a specific node to prevent the replacement thereof. It should be easily understood that the replacement of a specific node (upgrade or downgrade i.e., replacing the component pointed to by the node with a higher or lower version of the same) could be caused not only by a particular upgrade thereof by also by the replacement of some other node and the consequential conflict-resolving series of actions of the resolver module 40 discussed previously. The default preference is "no update" meaning that every component pointed to by this node will not be updated unless the user changes the preference.

The system upgrade information table 24 is built from diverse sources. The table 24 contains (a) all the components that were selected by the user to be upgraded or installed (using the component data table 28 either as a default or as a preference) (b) components that were not installed or upgraded previously (in reference to the original system information table 22) and (c) entirely new components that will be installed unless the user locked the nodes thereof in the component data table 28. As a result, the system upgrade table 24 has components that should be installed or upgraded in the operative system.

The system upgrade information table 24 has a list of actions to be done. The list of actions are built in the following form: "install 1024" or "update 1057 to 1058". An action is a request for installing and/or uninstalling. The list of actions is defined as single actions to be resolved by the conflict resolver module 40.

A single action on the list of actions includes "action-type" or "what is to be done" and "component type" or "to whom to do what is to be done". A component-type can be a list such as "install 1088, 1089, 1123". To apply the action type on the component type, a component type-specific rules-based dependency check has to be made. Each component type has a set of rules that must be satisfied in order for the component type to be installed. The rules are required regarding the consistence of the system after the preferred installation. The rules are based on sets of components or predefined relationships between the components. For example, "Mail 4.3.2" depends on "mail daemon". Rules can have a different "importance factor definition" or "importance weight" such as a "MUST" in which case the component will not be installed unless the rule is satisfied or a "RECOMMENDED" in which case the rule is not enforced automatically but left to the user's discretion. The rules are held in the rules tables 30. The xor rules are stored in xor rules table 32 and the add-remove rules are stored in the add-remove rules table 34. Both types of rules were described previously.

The sets of dependencies are lists of components with the attribute of either "XOR" (exactly one on or "OR" (at least one of). The list of components can be recursive, i.e.; it could be a list of lists. For example, Editor=OR (vi, vim, emacs), Vim=XOR (vim4, vim5), Vim5=XOR (vim5.1, vim5.2, vim5.3) and the like. The sets have inner priorities in order to enable choosing one of the components if the rules do not specify a specific one. Typically, the priorities will be determined by the order of the different versions, that is a component with a higher version number will have priority over the same component with a lower version number.

Following the execution of the dependency checks, the inter-component conflicts that were recognized need to be resolved. The resolving of the conflicts is accomplished by extending the action list. Each action has relevant rules, rules that might affect the possibility of achieving the action. For example, action "install component Z" might have a relevant rule such as "component Z needs component B" or "xor (component Z, component A)." In the first example, installation of the component Z requires the installation of the component B as well. In the second example, the installation of the component Z requires removal of the component A.

If the dependency checks result indicates that component Z, which has to be installed, needs component A for the correct operation thereof, then the conflict could be resolved only by installing component A as well. Accordingly, the action list would be extended with the action type/component type "install A" and the appropriate dependency checks would be executed on the newly added action by using the component A-specific rules. In such a manner, the action list is extended until no more conflicts are left to be resolved.

Therefore, the dependency check uses a recursively activated process. Each step takes the set of operative components, the related operative actions that resulted in said set of operative components, and a new action that should be performed. After the performance of the current step, the output from the step could be an extended set of operative components, an extended operative action list and a flag indicating "success" or "failure" of the prior step. A log file is managed for each step to display to the user the various stages leading up to the installation and/or upgrade of the originally requested components and the additional components installed and/or upgraded as necessary for conflict resolving.

The conflict-resolver module will be described next. Four lists are utilized as input data for the module: (1) the list of components in the original system information table 22 or the components installed before the preferred installation, (2) the set of actions to be done where an action is a request for installing, uninstalling or updating, (3) rules regarding the consistence of the preferred system from the rules tables 30 and (4) sets of components that can apparently replace each other from the component data table 28.

In the case of the successful completion of the conflict-resolver module, the output includes a list and an indicator. The list indicates all the possibilities to perform the task of a preferred update. Each item on the list is a sequence of actions to be performed one after the other. The indicator indicates success. In case of an unsuccessful completion, the module returns an indicator indicating failure.

Each action on the action list could be a complex action like having more than one component type when using the action type "install". For example, in the action "install component A, component B, component C, uninstall component D, component E, component F" the action will be divided into three parts defined as "trials" such as "install A uninstall D, E, F", "install B uninstall D, E, F" and the like. The trials are added to the action list replacing the original complex action with a specific flag added to the action record to indicate trial action.

For each action, the rules relevant to the action type and component type are checked. The rules checking process will be explained by using the example of the action "install X, uninstall Y, Z". First, the xor rules are checked. The xor set of component X has to be found and extracted from the xor rules 32. If the xor set of component X exists, then the set includes a set of components that only one of them could be operative in a consistent system. Consequently, if component X is required to be installed, all the other components in the xor set thereof must be removed. The implementation of the xor rule check is to alter the action list by adding the components of the xor set to the "uninstall" part. Therefore, all the components from the xor set of X, except X itself, that are on the list of components, i.e., installed in the operative system and not already in the uninstall part of the action list, are added to the part of the list.

The add-rules checking is performed by finding all the rules from add-remove rules 34 concerning component X such as "component X needs component A or component B or not component N or not component M". If none of the necessary components in the rule such as A or B are in the list of the operative system components and the list contains N and M, an action is created in the form of "install A or B or . . . ". The list of actions thus created is called the "pre-action list", as all these actions should be performed before installing X.

For each of the components to uninstall, remove checking is performed. Rules regarding uninstalling are extracted from add-remove rules 34. These rules are of the kind "component A needs component Y or component W or not component M", "component B needs component Z" and the like. For each such rule, the preferred system should stay in a consistent state after the performance of respective install and remove-rule-resulting uninstall actions. To describe it more in detail:

(a)"A is installed in the operative system, or will be installed by the action resulting from 'X needs A'."

(b) "All the components in the needed part of the remove-rule (Y, W) are not installed in the operative system or are in the uninstall part of the action list."

(c) "The 'or not' part components are installed in the operative system."

To satisfy the rule after the performance of the action a "post-action list" is created. The list includes actions that should be performed after the action list. Therefore, an "update A" action is inserted into the post-action list.

In the following description of the program logic and the sequentially or recursively executed sets of operative steps necessary to resolve practically all the component-related dependency conflicts, specific data structures used as ways for storage for specific computer-related abstractions such as constants, variables, lists and the like. For the clarity of the disclosure, designations of the data structures appear in the text of the description in upper case characters. The designations of the same data structures will appear on the associated drawing enclosed by single quotes. For example, the dynamic data structure holding the list of actions to be executed in order to perform a requested system upgrade will be specified as ACTIONS in the text of the description and as 'ACTIONS' on the related drawings. Occasionally, in order to provide for a more extended and clearer description, ACTIONS will be referred to as ACTIONS list, or a list of ACTIONS, and the like. The specific values given to data structures will appear both in the text of the description and on the drawings enclosed by double quotes such as it "success", "failure", and the like.

Figure 2:
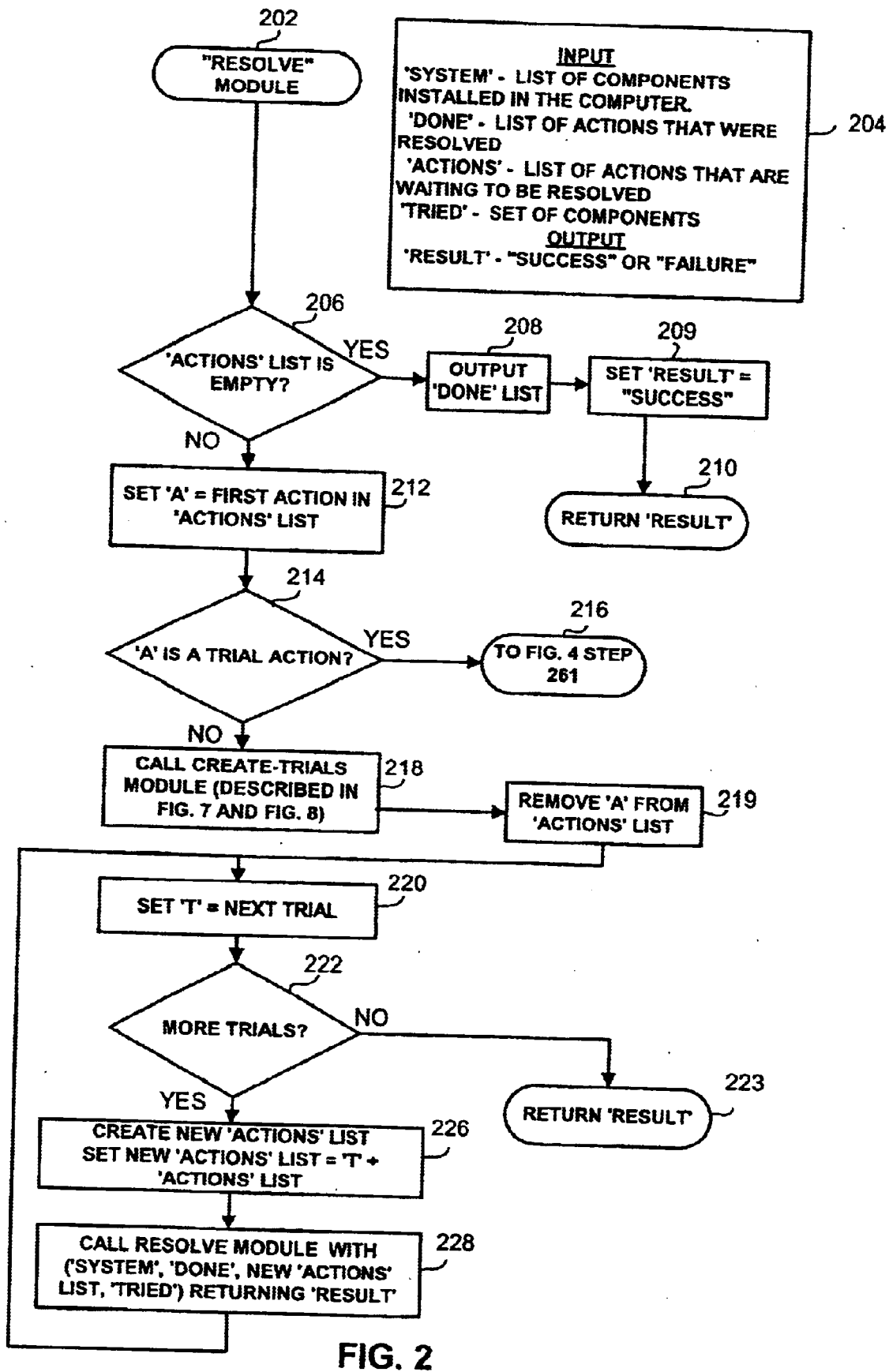
FIG. 2 is a flow chart illustrating the flow of program logic of an embodiment of a conflict resolver module, in accordance with the present invention.

FIG. 2 illustrates the flow of program logic of the conflict resolve module 202 which forms a part of conflict resolver module 40. The input and output data elements of the conflict resolver module 202 are held in allocated physical locations of the storage device 12 and are listed in frame 204. The input includes the following elements: (1) SYSTEM which is a list of components installed in the computer, (2) DONE which is the list of actions that were resolved, (3) ACTIONS which is the list of actions that are waiting to be resolved, and (4) TRIED which is a list or set of possible components to be used in the computer environment that were examined during the execution of the conflict resolver module 202 with regard to the suitability thereof for resolving a specific processed action and were found to be inappropriate. Initially, the DONE list is empty and ACTIONS is a list holding all the actions to be resolved. During the repeated iterations or recursive calls of conflict resolver module 202, DONE is being filled up with the resolved actions previously held in ACTIONS and copied from ACTIONS after the resolving thereof. TRIED is built and examined in relation to each action to be resolved in order to prevent endless loops. The output of conflict resolver module 202 includes a partial or a complete DONE list and a data element holding a Boolean value specified as RESULT which indicates the outcome of module 202 performance. The two predefined values RESULT indicator could be set to are "success" or "failure".

At step 206, the ACTIONS list is examined in order to check whether the list still stores any unresolved actions. If ACTIONS is empty at step 208, the DONE list is the final output. At step 209, the RESULT indicator is set to the value of "success" thereby enabling at step 210 the return of RESULT indicator to the calling routine indicating success.

If at step 206 ACTIONS list is found to hold unresolved actions, then at step 212 the first action in ACTIONS, specified as action A, is copied to a location of routine held in an allocated physical location in the storage device 12. At step 214, action A is examined in regard to the type thereof. If the type of A is found to be a trial action, then program control is passed at step 216 to a sub-routine of conflict resolver module 202 for the handling of trial actions. Such a sub-routine will be described hereunder in association with the following drawings. If the type of A was checked and found not to be a trial action, then at step 218 the sub-routine for creating trials is called. The create trials sub-routine will be described hereunder in association with the following drawings.

The execution of the trial-creating sub-routine creates a list of trial actions TRIAL-LIST. TRIAL-LIST is built by analyzing action A, extracting the operative steps from action A, and inserting the operative steps as trial actions into TRIAL-LIST. In effect, trial actions in TRIAL-LIST replace action A. Therefore, at step 219, action A is removed from the ACTIONS list. At step 220, the first trial action from the list of trial actions TRIAL-LIST, specified as T, is copied to a working segment of the routine. At step 222, it is examined whether T holds a valid trial-action. If T is a valid trial action, then a new action list ACTIONS is created by the insertion of T into ACTIONS at step 226. Consequently, the conflict resolver module 202 is called recursively with the group of the pre-defined parameters, which are set to different values for each recursive call. The called conflict resolver module 202 returns with a new DONE list having different actions stored, and a new RESULT indicator storing the values of either "success" or "failure". Subsequently, program control passes back to step 220 in order to handle the next trial action T from TRIAL-LIST. If no more trial actions are found in TRIAL-LIST at step 222, then RESULT indicator is examined at step 223 whether the prior recursive call produced a value of "success" or "failure", and at step 223 the value of RESULT is returned to the calling routine.

Figure 4:
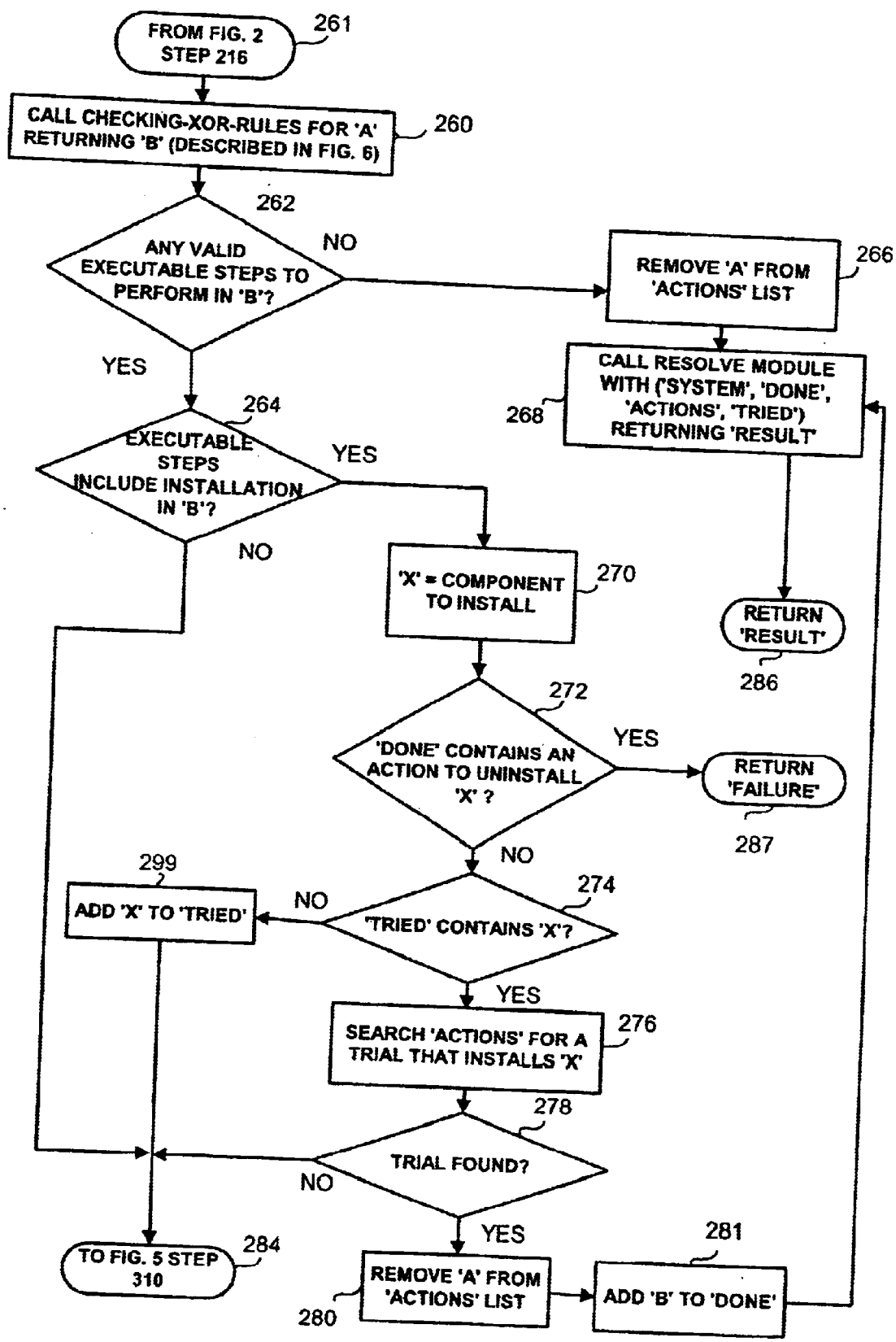
FIG. 4 and FIG. 5 are flow charts illustrating the operation of an embodiment of a program module that handles non-trial actions, in accordance with the present invention.

FIG. 4 illustrates the execution flow of the routine that handles trial actions at step 216. At step 260, action A is checked for the relevant xor rules by calling the appropriate subroutine and as a result, an action B is created. The detailed description of the called subroutine at step 260 will be set forth hereunder with association with the following drawings. At step 262, a check is performed on action B to determine whether the action has any valid executable steps such as installing or uninstalling components. If there are no such steps, at step 266 action A is removed from the list of ACTIONS and at step 268 the conflict resolver module 202 is called recursively with the new ACTIONS. At step 286, the conflict resolver module 202 returns with the appropriate value stored in RESULT indicator.

If there are valid executable steps in action B, then at step 264 B is examined whether the executable steps involve installation of components. If no such steps are found, then at step 284 program control passes to step 311 of FIG. 5. The detailed description of the flow logic therein will be set forth hereunder with the associated drawing.

When executable steps involving installation of components are found in action B at step 264, then at step 270 the component to install is copied to a working segment of the routine specified as X. Subsequently, at step 272 a check is made whether the list DONE contains an action to uninstall component X. If such an action is found, then the conflict resolver module 202 returns the value "failure" indicative of the failure of resolving action A. If the result of the check is negative, then next at step 274 the TRIED list is checked regarding the existence of X therein. If X does not exists in the TRIED list, then at step 299 X is added to TRIED, and program control passes to the add-remove rules checking routine. If TRIED does contain component X, then at step 276 ACTIONS is scanned to search for a trial action that installs X. If such an action is not found then program control passes to step 311 of FIG. 5 for further processing. In contrast, when a trial action that installs X is found, then at step 280, A is removed from ACTIONS, at step 281 B is added to DONE, and at step 268 the conflict resolver module 202 is called with the new set of input parameters. The conflict resolver module 202 returns an indicator as a result, specifying "success" or "failure".

Figure 5:
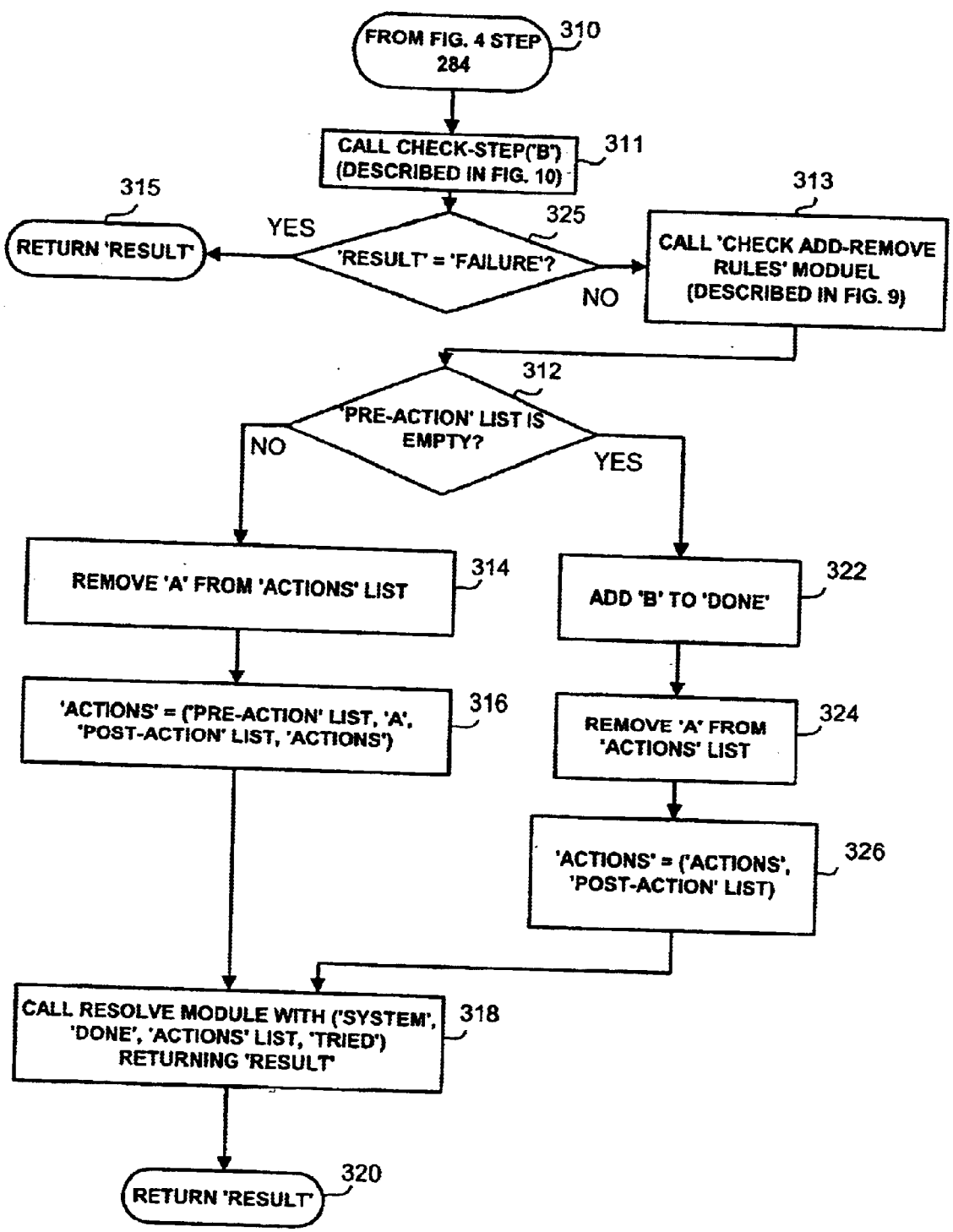

FIG. 5 shows the continuation of the flow of control from FIG. 4. At step 311, the check-step module of the conflict resolver module 202 is called with B passed as parameter and RESULT as the returned value. The operation of the module will be described hereunder in association with the accompanying drawing FIG. 10. The value of RESULT is examined at step 325. If the RESULT indicator returned by the module is "failure," then at step 315 the RESULT is returned to the calling routine. If the value stored in RESULT is "success," then at step 313 the check add-remove rules module 34 is called. The operation of the add-remove rules module 34 will be described hereunder in association with the accompanying drawing FIG. 9. At step 312, the PRE-ACTION list is examined related to the existence therein of any actions. If the list is empty, then action B is appended to the DONE list at step 322, action A is removed from ACTIONS list at step 324, POST-ACTION list is appended to ACTIONS list at step 326 and the conflict resolver module 202 is called recursively at step 318. At step 320, after program control returns from the called routine, RESULT indicator is returned to the calling routine.

Figure 6:
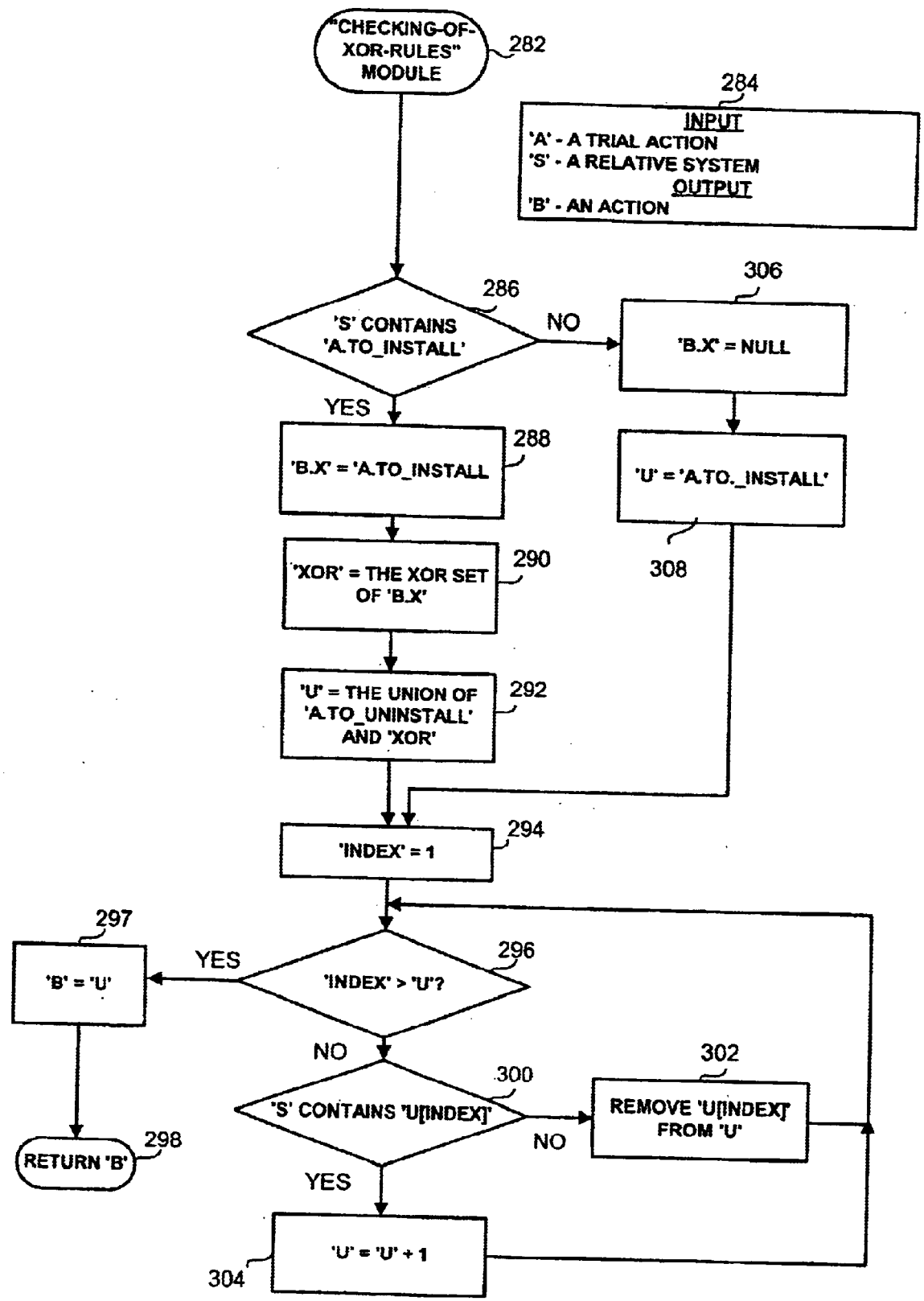
FIG. 6 is a flow chart illustrating the flow of program logic of an embodiment of a "checking-of-xor-rules" module, in accordance with the present invention.

If at step 312, the PRE-ACTION list is not found empty, then steps 314 through 320 are executed. At step 314, A is removed from the ACTIONS list and at step 316 the ACTIONS list is re-built by appending PRE-ACTION list, A, POST-ACTION list, and ACTIONS into ACTIONS. At step 318, the conflict resolver module 202 is called recursively. When program control returns to 320, the RESULT indicator returned from the called routine is returned to the calling routine FIG. 6 illustrates the execution flow of the xor-rules-checking routine generally referred to as module 282. In frame 284, the input and the output data elements associated with the routine are listed. The input to the routine may include A, which is a trial action passed from step 260 of FIG. 4, and S the relative system. The relative system is defined as the pairing of the system and the actions already resolved and to be performed on the system at any specific point in time during the execution of the module. The relative system S includes the list of components installed in the system and a list of actions to perform thereon. In order to examine whether a component is in the system, the relative system should be tested by a) checking if the component is in the system and b) examining the list of actions for the component in order to determine a potential installation or a potential removal of the component. The output of the module 282 is B, an action created as a result of the xor-checking of action A.

At step 286, the relative system S is tested to determine whether S contains the action for the installation of A specified as A.TO_INSTALL. If the result is positive, then A.TO_INSTALL is copied to the B.X variable at step 288. At step 290, the xor set of the B.X is extracted from the knowledge base 28 of FIG. 1 by utilizing the xor rules table 32 of FIG. 1 respective to the action B.X. As a result, at step 292 a set of actions U is created. U includes an A.TO_UNINSTALL action and the xor set thereof. At step 294, a loop control variable INDEX is set up and initialized to control the execution of the loop across step 296 through step 304. The loop is performed in order to examine whether S, the relative system, contains any of the actions U consists of. At step 296, it is determined whether all the actions in U were examined. If the result is positive, the loop terminates, the value of U is copied to B at step 297 and the value of B is returned to the calling routine at step 298. If not all actions in U are examined, then the loop continues to execute. At step 300, S is scanned to test if the specific action in U, specified as U[INDEX] exists in S. According to the result of the test either U[INDEX] is removed from U at step 302 and the loop continues to execute until all of U is examined or the loop control variable INDEX is incremented at step 304 and the loop continues to execute until all actions in U were examined. If at step 286 the relative system S is found not to contain A.TO_INSTALL, then at step 306 B.X is initialized to null, at step 308 A.TO_INSTALL is copied to U, and program control passes to step 294 in order to begin the loop across steps 296 and 304.

Figure 7:
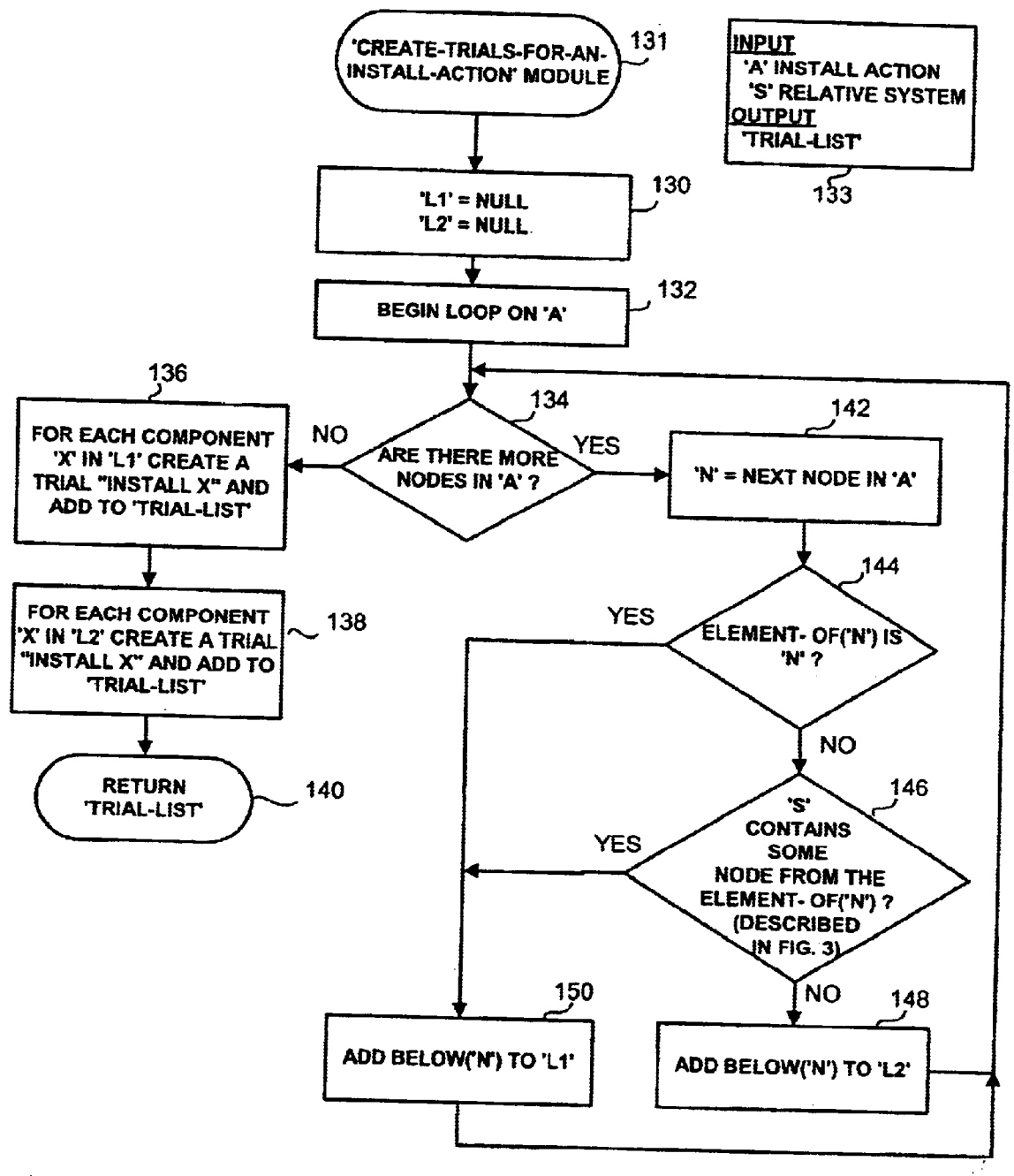
FIG. 7 is a flow chart illustrating the flow of program logic of an embodiment of a "create-trials-for-an-install-action" module, in accordance with the present invention.

FIG. 7 illustrates the flow of logic for the call create trials for install action module 131, called at step 218 of FIG. 2. The module contains three functions: a) below(N) that accesses the component data table 28 of FIG. 1 with node N and produces an ordered set of components below the node N, (inclusively, i.e., N is below N), b) element-of(N) that accesses the component data table 28 of FIG. 1 with node N and returns the element E above N, and c) contains(N) that accesses the relative system S with node N and returns indication whether S contains N, i.e., whether S contains any of below(N).

As shown at 133, the input for the create-trials-for-an-install-action module 131 may include A and S. A is an install action comprising a list of nodes. The number of resulting trial actions will be equal to the total number of components below the nodes. S is the relative system comprising the system and the list of components to install at any given point of time during the execution of the conflict resolver module 202. The output of the module 131 is the 'TRIAL-LIST' including all the trial-actions resulting from the input A. At step 130, two list variables L1 and L2 are initialized to null. At step 132, a loop across the nodes of A is activated. At step 134, A is examined whether there are any more nodes therein. If there are nodes to process therein, then at step 142 the next node in A is copied to a physical location allocated on the storage device 12 that is specified as working segment N. Consequently, at step 144 the function element-of(N) is called in order to obtain from the component data table 28 of FIG. 1 the element above N. At step 144, a test is made to determine if the element-of(N) is N itself. If the result is positive at step 150, the below(N) function is called and resulting set of components is appended to the list L1. The loop continues at step 134. If the result of step 144 is negative, then at step 146 the contains (N) function is activated in order to determine whether the relative system S contains N. When the result is positive, step 150 is executed by appending the set of components obtained to the list L1. A negative result affects the execution of step 148 in which the set of components obtained from function below(N) is appended the list L2. Both conditions result in the continuation of the loop at step 134 until all the nodes in A are processed. When the required operations in A are completed, the loop terminates and the steps 136, 138, and 140 are performed to create TRIAL-LIST by processing lists L1 and L2, respectively. For each component X on the lists L1 and L2, a trial action "install X" is created at step 136, and appended to TRIAL-LIST at step 138. At step 140, the entire TRIAL-LIST is returned to the calling module, i.e., the resolve module 202 calling from FIG. 2 in step 218.

Figure 8:
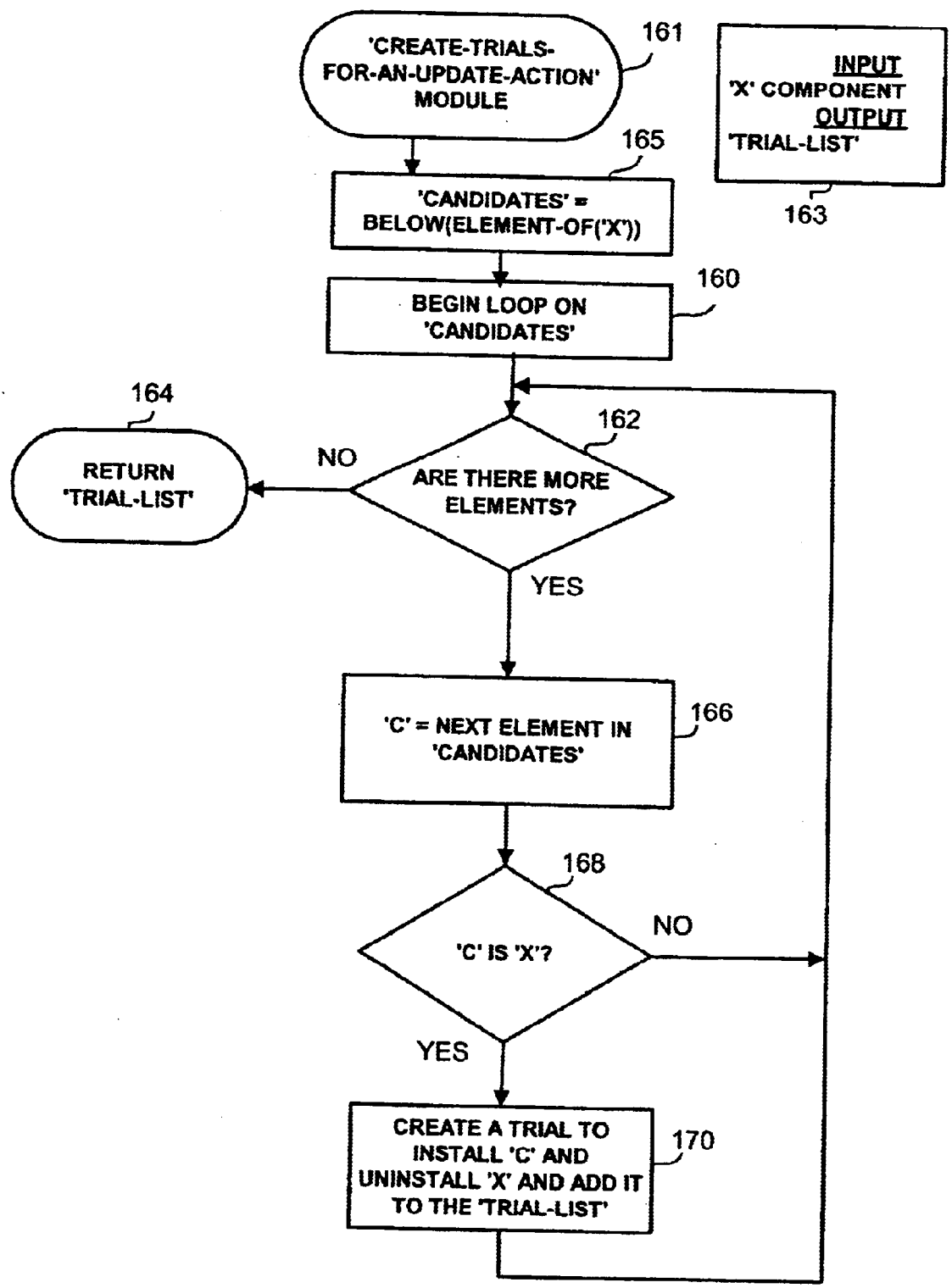
FIG. 8 is a flow chart illustrating the flow of program logic of an embodiment of a "create-trials-for-an-update-action" module, in accordance with the present invention.

FIG. 8 illustrates the flow of logic for the creation of trials for update action module 161 called at step 218 of FIG. 2. As shown at 163, the input for the module 161 is X, a component, and the output is the TRIAL-LIST. At step 165, the list specified as CANDIDATES is created by calling the functions element-of(X) and below(result of element-of (X)). At step 160, a loop is activated on the CANDIDATES. The exit from the loop is controlled at step 162 by examining whether there are any unprocessed elements left in the list CANDIDATES. At step 166, an element from the list is copied to a working segment specified as C and examined at 168 in order to determine whether C is equal to the component X. If C is X, then at 170 the trial actions "install C"

and 61 "uninstall X" are created and appended to TRIAL-LIST. The loop continues at step 162. When all the elements in CANDIDATES are processed, an exit from the loop is accomplished at step 162 and TRIAL-LIST is returned to the resolve module 202 at step 219 of FIG. 2.

Figure 3:
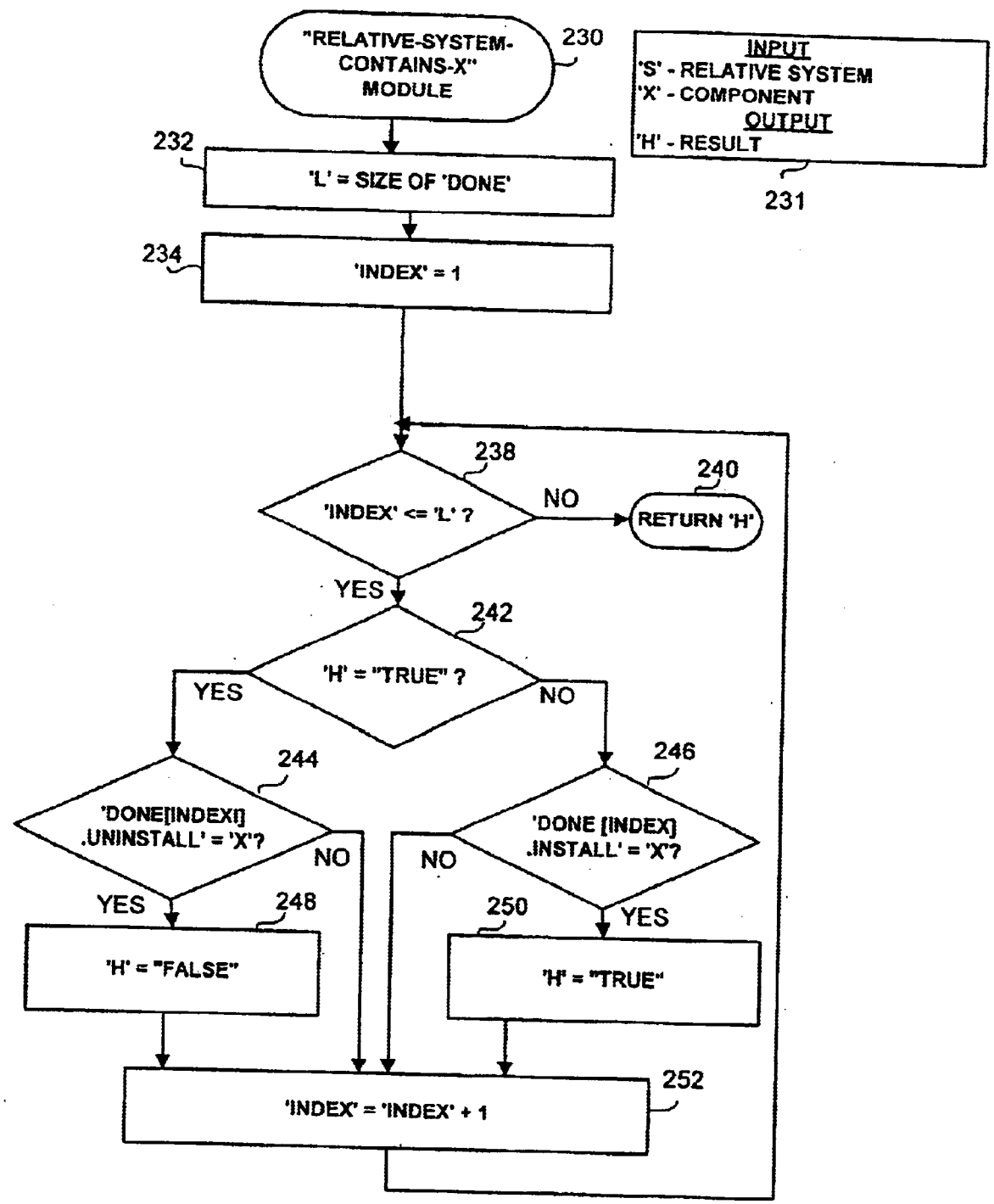
FIG. 3 is a flowchart illustrating the flow of program logic of an embodiment of a "relative-system-contains-X" module, in accordance with the present invention.

FIG. 3 illustrates the steps of the 'relative-system-contains-X' module. The module is called from step 146 of FIG. 8 in order to examine whether the relative system contains the node X. The input and the output data elements of the module are shown in frame 231. The input includes S the relative system, and X the node to examine. The output is specified as H, which is an indicator the value of which is to be set to "false" or "true" consequent to the module operation. At step 232, the size of DONE is calculated and copied to a physical location allocated on storage device 12, intended to be used as a working segment and specified as L. At step 234, a loop control variable INDEX is initialized and the loop is activated at step 238. When the examination of the entire contents of DONE is completed, the current value of H is returned to the calling module. As long as the loop is active, the following steps are executed for each component in the list DONE: At step 242 the value of H is tested. If the value is "true," then at step 244 a check is made to determine whether X is equal to the uninstall action in DONE which is specified as DONE[INDEX].UNINSTALL. When the result of the compare operation is positive, H is set to "false" at step 248, INDEX is incremented at step 252 and program control returns to step 238 in order to continue the execution of the loop. When the result of the compare operation is negative, at step 252 INDEX is incremented and the loop continues to be performed. If at step 242 the value of H is not "true," then at step 246 a check is made to determine whether X is equal to an install action in DONE specified as DONE[INDEX]. INSTALL. A positive result will affect the setting of the value of H to "true" at step 250. Subsequently at step 252, INDEX is incremented and control returns to 238 to continue the execution of the loop. A negative value will affect the execution of step 252 only without setting the value of H and return to 238 to continue the execution of the loop.

Figure 9:
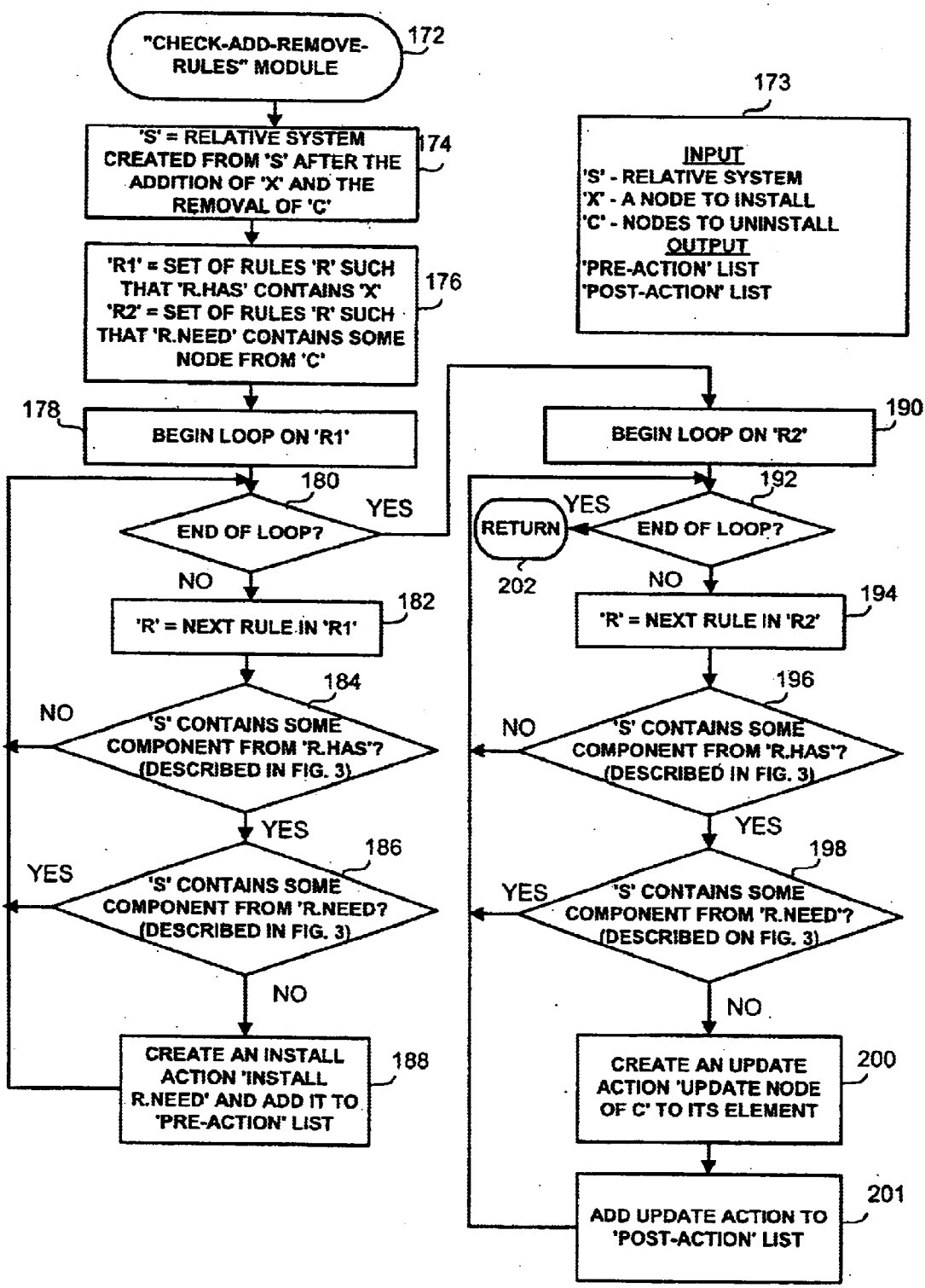
FIG. 9 is a flow chart illustrating the flow of program logic of an embodiment of an "check-add-remove-rules" module, in accordance with the present invention.

FIG. 9 illustrates the flow of logic of a check-add-remove rules module 172. The input and the output data elements of module 172 are shown in frame 173. The input includes S the relative system, X the node to install, and C the list of nodes to uninstall. The output of module 172 includes the lists PRE-ACTION and POST-ACTION.

Module 172 updates S at step 174 by adding node X and removing C from DONE. At step 174, two sets of rules are created by accessing the knowledge base 26 of FIG. 1 and activating the appropriate routines. The set of rules relating to the installation of X is specified as R1 and the set of rules relating to the uninstalling of C is specified as R2. At step 178, the first loop is activated in order to process R1. The loop control is operative at step 180. When all the processing of the rules in R1 is completed, the first loop is terminated and control passes to 190 to activate the second loop to handle R2. The first loop includes steps 182 through 188. At step 182, the next rule in R1 is copied to physical location allocated on the storage device 12, intended to be used as a working segment, and specified as R. At step 184, the "relative-system-contains-X' module 230 is called to examine whether S contains components associated with the rules related to X. If the result is affirmative, control passes to step 186 to examine whether S contains components associated with rules related to C. If the result of the test is negative, an install action "install R.NEED" is created at step 188 and appended to PRE-ACTION list. In contrast, when the result of the test is negative, program control passes to step 180 to continue the execution of the first loop. If the result of the operation at step 184 is negative, then program control passes back to step 180 to continue the execution of the loop.

When the first loop is completed the second loop is activated at step 190 to process list R2. The loop control is operative at step 192. When all the processing of the rules in R2 is completed, the second loop terminates and control returns to the calling routine. The second loop includes steps 192 through 201. At step 194, the next rule in R2 is copied to a physical location allocated on the storage device 12 intended to be used as a working segment, and specified as R. At step 196, the "relative-system-contains-X' module 230 is called to examine whether S contains components associated with the rules related to X. If the result is affirmative, program control passes to step 198 to examine whether S contains components associated with rules related to C. If the result of the test is negative, then at step 200 an update action "update node of C" is created and added at step 201 to the POST-ACTION list. In contrast, when the result of the test is positive, program control passes to step 192 in order to continue the execution of the second loop. If the result of the operation at step 196 is negative, then program control passes back to step 192 to continue the execution of the loop.

FIG. 10 illustrates the flow of logic of the check-step module 80. The module 80 is associated with the processing of the locks, the user's preferences and the mode of operation of the virtual upgrade process. The input and output data elements of the module 80 are shown in frame 81. The input includes the following parameters: MODE specifying the method of operation such as "interactive mode", B the action to perform, LOCKS a set of components that were locked by the user in order to present installation or removal thereof, and NOBACK a set of elements indicating the set of versions for a specific component. The output is RESULT that would be set to the value of "success" or "failure" according to the result of the operation. The module 80 is called from step 311 of FIG. 5. B is the action to perform and includes B.X that are components to install and B.CI that are components to uninstall.

At step 82, the first element of B.X is copied to a physical location allocated on the storage device 12, intended to be used as a working segment, and specified as E and at step 84 a loop is initiated over B.CI. The loop control is operative at step 86. As long as the loop is active, the steps 86 through 112 are executed. At step 90, LOCKS is examined to check whether LOCKS contains B.CI. If the result of step 90 is positive, at step 92 MODE is examined to check whether the value thereof is "interactive mode". If the result is negative, RESULT is returned to the calling routine with the value of "failure". If the result of step 92 is positive, the user's permission is requested at step 96 to remove the lock from the component. Subsequent to the user's refusal at step 100, RESULT is set to the value of "failure" and returned to the calling routine at step 102. In contrast, if the user allows the removal of the lock from the component at step 100, a series of tests are made at steps 98, 104, and 106. At step 98, NOBACK is examined in regard to the presence of B.CI therein. If B.CI is not in NOBACK, control returns to step 86 to continue the loop. If NOBACK contains B.CI, at step 106 the location of B.CI relative to E and B.X is tested. If B.CI is below E and before B.X in the component data 28 of FIG. 1, then MODE is checked regarding the method of operation. If the method is not interactive, RESULT is set to "failure" and program control returns to the calling routine at step 108. In interactive mode, the user is asked for permission to go back in component versions. If permission is not given, the value of RESULT is set to "failure" and returned to the calling program at step 114. If user permission is granted, program control returns to step 86 to continue with the execution of the loop. Consequent to the successful processing of the entire set of components to uninstall the loop terminates at step 86, the value of RESULT is set to "success" and at step 88 RESULT IS returned to the calling routine.

The above described conflict resolver module and the associated functions thereof are proposed as central constituent of an integrated tool intended to resolve inter-component dependencies among hardware and software entities in an operative computer system and thereby accomplish a seamless system upgrade. For each hardware and software entity to be added to the system or removed from the system the resolve module analyzes the entity compatibility requirements in regard to other related software, hardware or operating system entities. The analyzing includes locating and processing the entire set of related entities in accordance with a set of predefined rules. As the process is recursive by nature, i.e., each new entity processed and inserted into the system following of the requirements of the original entity, necessitates further analysis in regard to still another set of entities related to the newly inserted entity, further processing, and further insertions into the system, where each new action involves a new set of actions. After all the entities are processed, practically all dependencies are resolved and the system contains only entities that are capable functioning together as an operative system.

It should be clearly understood that the description of the computing environment as a totality, the associated tables, programs and methods are provided in the text of this document for the purpose of enabling a better understanding of the present invention, and not intended as any limitation on the potential uses that will utilize the fundamental concepts of the disclosure within the scope of the attached claims.

Persons skilled in the art will appreciate that the present invention is not limited to what has been particularly shown and described hereinabove. Rather the scope of the present invention is defined only by the claims, which follow.

We claim:

1. A method of assisting users of a computer system in the conduct of an upgrade of said computer system by establishing automatically an operatively correct combination of a set of components constituting said computer system through resolving inter-component dependency conflicts arising among said set of components, the method comprising:

obtaining at least one hierarchically organized control table from a computer storage device, said at least one hierarchically organized control table storing a first set of information regarding a set of components utilized as constituent parts of said computer system;

setting up at least one result table on said computer storage device, said at least one result table storing a second set of information resulting from automatically establishing an operatively correct combination of two or more components within said set of components utilized as constituent parts of said computer system;

examining said at least one hierarchically organized control table for inter-component dependency conflicts arising among said second set of information;

identifying said inter-component dependency conflicts arising among said second set of information;

creating result-related actions based on an inter-component dependency conflicts resolving process;

obtaining an at least one system upgrade action from a system upgrade table;

disassembling said at least one system upgrade action so that said at least one system upgrade action contains at least one component and at least one system upgrade operation;

checking an at least one xor rule associated with an inter-component dependency rules language, the at least one xor rule reflects an at least one inter-component relationship rule referring to said at least one component associated with said at least one system upgrade action; and checking an at least one add-remove rule associated said inter-component dependency rules language, said at least one add-remove rule reflects an at least one inter-component dependency relationship rule referring to said at least one component associated with said at least one system upgrade action.

2. The method of claim 1, wherein said obtaining said at least one hierarchically organized control table comprises:

obtaining a system information table comprising a set of operative components installed in said computer system;

obtaining a first system upgrade table comprising a set of operative components required to be installed in said computer system;

obtaining a component objects table comprising a set of installation-related components;

obtaining a component database containing a structured index of said component objects table; and obtaining an inter-component dependency rules table comprising installation-related inter-component dependency rules derived from said inter-component dependency rules language.

3. The method of claim 2, wherein said component database is organized in a tree-like hierarchical data structure.

4. The method of claim 2, wherein said component database comprises component indices connected according to explicit inter-component dependency relationships among said set of operative components.

5. The method of claim 4, wherein said component database is linked to said at least one inter-component dependency rules table by said component indices.

6. The method of claim 2, wherein said inter-component dependency rules in said inter-component dependency rules table include at least one xor operator and an at least one add-remove operator.

7. The method of claim 1, wherein said setting up at least one result table comprises:

building a resolved system upgrade actions table for the purpose of storing inter-component dependency conflict-free system upgrade actions;

building a second system upgrade table for the purpose of storing unexamined system upgrade actions;

building a third system upgrade table; and copying said first system upgrade table into said second system upgrade table.

8. The method of claim 7, wherein said resolve-related actions are appended to said at least one system upgrade action and processed like the same.

9. The method of claim 1 further comprising:

inserting a set of at least one action into a second system upgrade table;

obtaining said at least one action from said second system upgrade table;

processing user preferences concerning the execution of each member of said at least one action arising from said inter-component dependency conflicts resolving process;

inserting said at least one action into a resolved system upgrade actions table; and removing said at least one action from a third system upgrade table thereby indicating that the system upgrade action is inter-component dependency conflict-free.

10. The method of claim 9, wherein said processing user preferences comprises:

obtaining at least one user preference record relating to at least one lock placed on at least one action;

obtaining said at least one user preference record containing a user authorization mechanism concerning utilization of prior versions;

determining a mode of operation;

examining said at least one action in association with said at least one user preference record and said mode of operation;

determining whether said at least one user preference record is blocking said inter-component dependency resolving process; and enabling manual removal of said at least one user preference record.

11. The method of claim 10, wherein said at least one user preference record is enabled to be removed as blocking said inter-component dependency conflict resolving process.

12. The method of claim 1, wherein said checking said at least one xor rule comprises:

examining a system information table in combination with at least one resolved system upgrade action corresponding to said at least one action;

obtaining at least one xor rule concerning said at least one action from said xor rules table;

combining said at least one xor rule with said at least one action to generate a combined set;

checking said combined set in regard to existence in said system information table;

checking said combined set in regard to existence in said resolved system upgrade actions table; and removing actions from said combined set which do not appear in said system information table and said resolved system upgrade actions table.

13. The method of claim 1, wherein said checking said at least one add-remove rule comprises:

obtaining said at least one action-related add-remove rule from an add-remove rules table;

resolving an at least one added install action required by said at least one action;

creating a list of the at least one install action corresponding to said at least one add-remove rule;

resolving an at least one added replace action required by said at least one action; and creating a list of at least one update action corresponding to said at least one add-remove rule.

14. The method of claim 1 further comprising inserting resolve-related actions into said at least one result table.

15. The method of claim 1 further comprising notifying a user of said computer system of resolve-related actions thereby accomplishing a system upgrade by outputting the content of an at least one result table.

16. The method of claim 15 wherein said at least one system upgrade action comprises an at least one component and an at least one upgrade instruction.

17. The method of claim 1 where said set of components comprises hardware components, application software components, utility software components, and system software components.

* * * * *